Patented Jan. 6, 1953

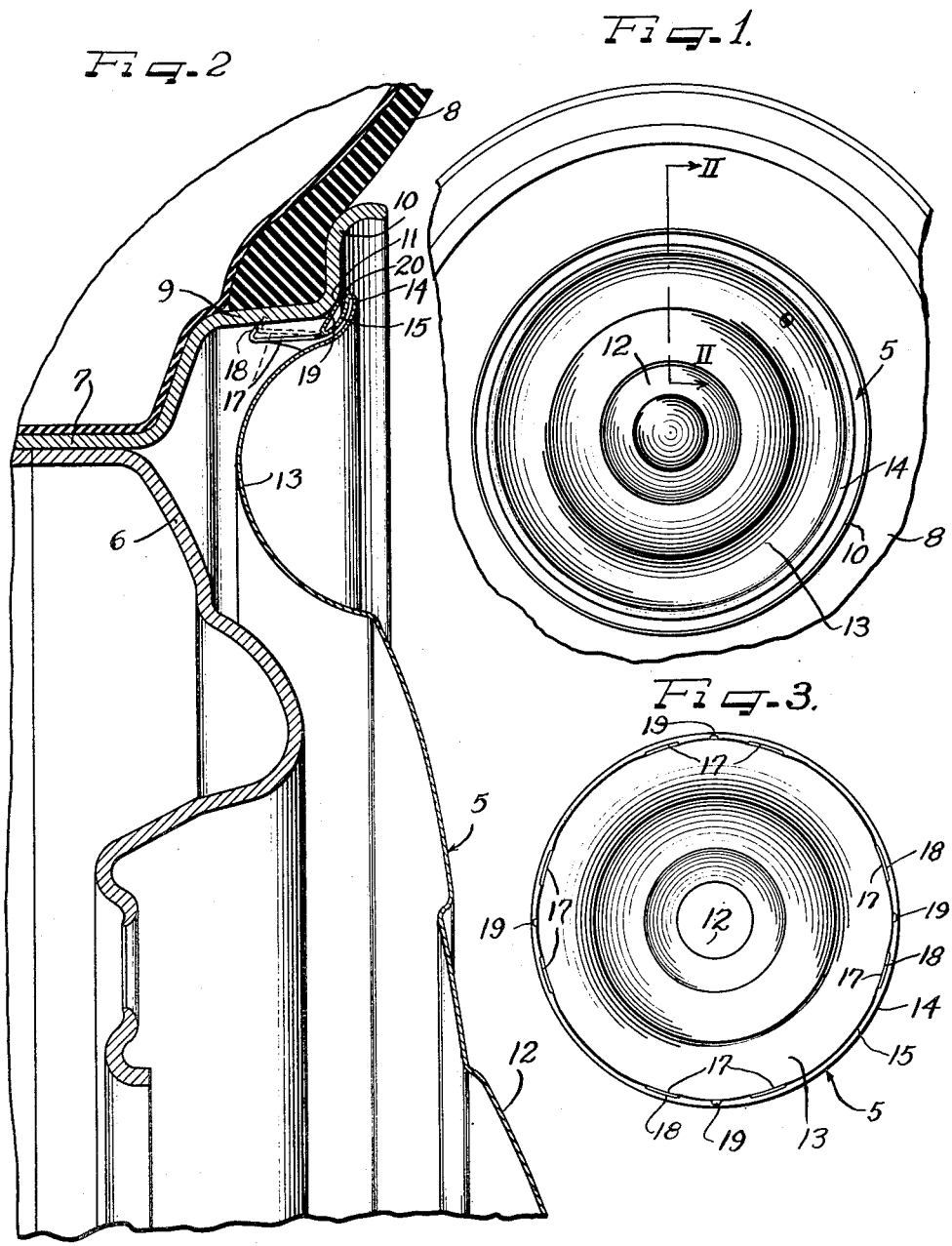

2,624,630

UNITED STATES PATENT OFFICE 2,624,630

WHEEL COVER

George Albert Lyon, Detroit, Mich.

Application January 26, 1949, Serial No. 72,979

12 Claims. (Cl. 301—37)

The present invention is concerned with improvements in wheel structures and more particularly concerns the protection and ornamentation of the outer sides of vehicle wheels by means of removable wheel covers.

An important object of the present invention is to provide an improved wheel structure having thereon a self-retaining cover which is formed with novel self-retaining finger structure engaging with the tire rim of the wheel.

Another object of the invention is to provide an improved self-retaining wheel cover for application to the outer side of a vehicle wheel and having novel means for retainingly engaging with a part of the wheel.

A further object of the invention is to provide an improved vehicle wheel cover having novel retaining means including limiting structure which is effective to maintain a spaced relation between certain portions of the cover and the wheel.

Yet another object of the invention is to provide in a wheel cover improved marginal retaining structure thereon for effectively retaining the cover on a wheel.

According to the general features of the present invention there is provided in a wheel structure including a tire rim of the multi-flange type and a wheel body, a cover for the outer side of the wheel including a marginal retaining flange structure comprising a plurality of retaining fingers at predetermined intervals about the periphery of the cover for engagement with a part of the tire rim and thereby retention of the cover on the wheel, said retaining fingers being spaced apart, and limit tabs projecting from the marginal flange intermediate said fingers for engaging against the tire rim to limit the axially inward disposition of the cover on the wheel.

According to other general features of the invention there is provided in a wheel structure including a multi-flange tire rim and a load sustaining body part, a cover for the outer side of the wheel including a plurality of marginal retaining fingers for frictional wedging self-retaining engagement with a flange of the tire rim, and a plurality of radially extending limit tabs for engagement with the tire rim to hold the margin of the cover in axially outwardly spaced relation to the tire rim to afford a ventilation gap between the edge of the cover and the tire rim.

Other objects, features and advantages of the present invention will be readily apparent from the following detailed description of a preferred embodiment of the invention taken in conjunction with the accompanying drawings in which:

Figure 1 is a fragmentary side elevational view of a vehicle wheel assembly embodying the features of the invention;

Figure 2 is a radial sectional view on an enlarged scale taken substantially on the line II—II of Fig. 1; and Figure 3 is a rear elevational view of the cover prior to application to the wheel.

As shown on the drawings:

A cover 5 embodying the features of the invention is shown as comprising a substantially full covering disk for the outer side of a vehicle wheel comprising a load sustaining body portion 6 and a tire rim portion 7, the latter being of the more or less conventional multi-flange drop center type adapted to support a pneumatic tire and tube assembly 8 and including an intermediate generally axially outwardly and slightly radially outwardly frusto-conically shaped intermediate flange 9 merging with an outer terminal flange 10 on a rounded shoulder 11.

The wheel cover 5 includes a crown portion 12 of preferred configuration and having a marginal generally concave annular portion 13 which is formed with a generally radially outwardly extending underturned reinforcing fold including an underturned return bent flange 15. As best seen in Figure 2, the visible portion of the outer margin of the cover may be of generally convex cross-section with the return bent marginal flange 15 comprising substantially a ring or annulus nested at the rear surface of the outer margin.

The marginal flange 15 is formed with means for retaining the cover on the wheel by engagement with the tire rim 7 and more especially the intermediate flange 9 thereof. To this end, the flange 15 is formed with a plurality of generally axially inward finger or tab extensions 17 each of which is formed with a generally radially outwardly and somewhat axially outwardly extending terminal finger flange 18 disposed in an annular row with the finger flanges of the remaining finger extensions. By preference, the extension tabs 17 are formed by pairs in equidistantly spaced groups, such as four groups about the margin of the cover. The diameter of a circle described about the finger extensions 17 is slightly less than the inside diameter of the tire rim intermediate flange 9 so that in applying the cover to the wheel the finger extensions 17 will fit between the tire rim flange 9 and the adjacent portion of the marginal groove formation 13 of the wheel cover. Prior to application of the cover to the wheel, the finger extensions 17 preferably diverge or flare radially outwardly to a limited extent so that the tips of the retaining finger flanges 18 thereof extend initially to a substantially larger diameter than at least an intermediate portion of the inside face of the intermediate flange 9. Each of the retaining finger extensions 17, moreover, is preferably of arcuate cross section transversely and of gradually greater base width than at its end so that it is possessed of a substantial stiffness but yet resilience permitting it to be deflected radially inwardly under pressure applied to the tip of the terminal flange 18. In order to enhance the retention qualities of the retaining fingers, the terminal flanges 18 are quite short and of substantial width so that they are stiff and relatively nonyielding.

In applying the cover 5 to the wheel, the cover is generally centered with respect to the wheel and with the terminal retaining flanges 18 of the retaining fingers in engagement with the axially outer margin of the tire rim intermediate flange 9. In this condition the finger extensions 17 are in their maximum flaring condition as indicated in dash outline in Fig. 2. Then the cover is pushed axially inwardly to drive the retaining finger flanges 18 axially inwardly along the inner face of the intermediate flange 9. As the flange 9 diminishes in diameter axially inwardly the retaining finger flanges 18 are correspondingly deflected radially inwardly, such deflection being effective by resilient flexing of the body portions of the finger extensions 17 since the terminal flanges 18 are relatively stiff and thus practically unyielding in themselves. As the finger extensions 17 are flexed inwardly they effect progressively greater resilient outward pressure against the tire rim flange 9 through the tips of the retaining terminal flanges 18 which are thus forced into thorough retaining, gripping, wedging engagement with the inner face of the tire rim terminal flange. In the finally assembled condition of the cover with the wheel, the retaining finger extensions 17 may assume a substantially axially inward extension position from the generally outwardly flared position in the unmounted condition of the cover.

In order to remove the cover from the wheel, a pry-off tool is inserted between the marginal reinforcing fold 14 and the tire rim, and more especially the shoulder 11 of the tire rim and pry-off force applied to the margin of the cover which causes the cover to be deflected to a certain extent radially as permitted by an additional range of radial flexing inherent in the retaining finger flange portions 17 and more especially those at the opposite side of the wheel from the point of pry-off force. This relieves the tension on the retaining fingers adjacent to the point of pry-off force and they can be slidably disengaged from the tire rim intermediate flange 9 by the axially outward component of the pry-off force. This may have to be repeated at spaced points around the wheel cover to release the grip of the retaining flanges incrementally until the cover has been canted enough to permit complete release and removal from the wheel.

In order to afford at least a certain degree of floating resilience for the cover as well as to maintain the margin of the cover in spaced relation to the tire rim not only to provide a gap for insertion of a pry-off tool but also to permit air circulation behind the cover, means are provided in the form of limiting fingers or tabs 19 which are also formed as extensions from the underturned marginal flange 15. In the present instance one of the limit tabs 19 is provided between each pair of the retaining finger extensions 17 and all of the limit tabs are disposed in an annular row. Each of the tabs 19 is formed directly from the material of the flange 15 and is bent to extend generally radially outwardly from a point adjacent the base line of the retaining finger extensions 17 and thus spaced axially outwardly from the retaining finger terminals 18 and lying in spaced adjacency to the back of the marginal fold 14 as represented by the underturned flange 15. The length of the limit tabs 19 is such that they are hidden behind the marginal fold 14 of the cover but will engage against the tire rim shoulder 11 after the cover has been moved axially inwardly to a predetermined extent in mounting the same. Thereby the tabs 19 are placed under some resilient tension but will resist inward movement of the cover beyond the predetermined desired extent wherein a gap 20 remains between the reinforcing and concealing marginal fold 14 of the cover and the shoulder 11 of the tire rim. To some extent the resilient tension of the limiting tabs or fingers 19 acts upon the adjacent retaining fingers to improve the resilient cover retaining tension thereof and to improve the retaining gripping action of the retaining terminal flanges.

The present application is a continuation in part of my copending application Serial No. 791,308, filed December 12, 1947, and which has been abandoned in favor of the present application.

I claim as my invention:

1. In a wheel structure including a tire rim of the multi-flange type and a wheel body, a cover for the outer side of the wheel including a marginal retaining flange structure comprising a plurality of retaining fingers at predetermined intervals about the periphery of the cover for engagement with a part of the tire rim and thereby retaining the cover on the wheel, said retaining fingers being spaced apart, and limit tabs projecting from the marginal flange intermediate said fingers for engaging against the tire rim to limit the axially inward disposition of the cover on the wheel.

2. In a wheel structure including a multi-flange tire rim and a load sustaining body part, a cover for the outer side of the wheel including a plurality of marginal retaining fingers for frictional wedging self-retaining engagement with a flange of the tire rim, and a plurality of radially extending limit tabs for engagement with the tire rim to hold the margin of the cover in axially outwardly spaced relation to the tire rim to afford a ventilation gap between the edge of the cover and the tire rim.

3. In a wheel cover of the self-retaining type, a plurality of pairs of retaining finger extensions extending axially rearwardly at the margin of the cover and adapted to engage in retaining relation with a flange of a tire rim, and a limit finger between each pair of retaining finger extensions and adapted to engage the tire rim to limit axial inward disposition of the cover on the wheel.

4. In a wheel cover for disposition at the outer side of a vehicle wheel, a marginal flange on the cover, a plurality of rearwardly extending retaining fingers behind said marginal flange, each of said fingers being radially resiliently deflectable and having a generally radially extending relatively stiff short wheel-engaging terminal flange, and a plurality of radially extending limit fingers behind said marginal flange and spaced axially outwardly relative to said engagement terminal flanges.

5. A wheel cover for disposition at the outer side of a wheel including a tire rim having an intermediate generally axially outwardly extending flange, the cover having a marginal retaining structure including a plurality of generally axially inwardly extending and radially outwardly flaring retaining fingers including terminal retaining flanges extending generally radially outwardly to a normal diameter greater than the inner diameter of the tire rim intermediate flange, said fingers being deflectable radially inwardly in response to retaining engagement of the tire rim flange by said retaining terminals, said fingers being of resilient formation which places them under progressively increasing tension as they are deflected radially inwardly, and a plurality of resilient limit fingers on the cover engageable with the tire rim in spaced relation to said engagement terminal flanges and operative to improve the resilient tension of the retaining fingers as an incident to engagement of the tire rim by said light fingers under tension.

6. In a wheel structure including a tire rim having an intermediate generally axially extending flange, a cover member having a marginal formation to substantially conceal the tire rim, said marginal formation having therebehind retaining fingers engaging the intermediate flange, and means extending from the marginal formation concealed thereby and intervening between the marginal formation and the tire rim to retain the margin of the cover in spaced relation to the tire rim and thereby providing a gap between the tire rim and the edge portion of the cover.

7. In a wheel structure including a wheel having a multi-flanged and shouldered tire rim part and a wheel body part, a circular cover for disposition on an outer side of the wheel and having an outer edge spaced from an outer flange of the rim part and means at the outer margin of the cover for detachably connecting the cover to a flange of the rim part comprising an annular portion behind the outer margin of the cover and having a plurality of rows of spaced fingers, one row of fingers being positioned to bottom against a shoulder of the rim part to assist in centering the cover and to serve as abutments for limiting axial movement of the cover, and the other row of fingers being disposed for detachable retaining engagement with the surface of a flange of the rim part.

8. In a wheel structure including a wheel having a multi-flanged and shouldered tire rim part and a wheel body part, a circular cover for disposition on an outer side of the wheel and having an outer edge spaced from an outer flange of the rim part and means at the outer margin of the cover for detachably connecting the cover to a flange of the rim part comprising an annular portion behind the outer margin of the cover and having a plurality of rows of spaced fingers, one row of fingers being positioned to bottom against a shoulder of the rim part to assist in centering the cover and to serve as abutments for limiting axial movement of the cover, and the other row of fingers being disposed for detachable retaining engagement with the surface of a flange of the rim part, said outer cover margin and said annular portion being complementarily bowed and being joined together at the outer edge of the cover.

9. In a wheel structure including a wheel having a multi-flanged and shouldered tire rim part and a wheel body part, a circular cover for disposition on an outer side of the wheel and having an outer edge spaced from an outer flange of the rim part and means at the outer margin of the cover for detachably connecting the cover to a flange of the rim part comprising an annular portion behind the outer margin of the cover and having a plurality of rows of spaced fingers, one row of fingers being positioned to bottom against a shoulder of the rim part to assist in centering the cover and to serve as abutments for limiting axial movement of the cover, and the other row of fingers being disposed for detachable retaining engagement with the surface of a flange of the rim part, said annular portion joining the cover margin by a turned outer edge of the cover and said turned edge forming a reinforcing pry-off edge for the cover spaced from the outer flange of the tire rim part.

10. In a wheel structure including a wheel having a multi-flanged and shouldered tire rim part and a wheel body part, a circular cover for disposition on an outer side of the wheel and having an outer edge spaced from an outer flange of the rim part and means at the outer margin of the cover for detachably connecting the cover to a flange of the rim part comprising an annular portion behind the outer margin of the cover and having a plurality of rows of spaced fingers, one row of fingers being positioned to bottom against a shoulder of the rim part to assist in centering the cover and to serve as abutments for limiting axial movement of the cover, and the other row of fingers being disposed for detachable retaining engagement with the surface of a flange of the rim part, said other row of retaining fingers being inclined axially and radially outwardly toward the rim part behind the outer margin of the cover.

11. In a wheel structure including a wheel having a multi-flanged and shouldered tire rim part and a wheel body part, a circular cover for disposition on an outer side of the wheel and having an outer edge spaced from an outer flange of the rim part and means at the outer margin of the cover for detachably connecting the cover to a flange of the rim part comprising an annular portion behind the rear surface of the outer margin of the cover and having a plurality of rows of spaced fingers, one row of fingers being positioned to bottom against a shoulder of the rim part to assist in centering the cover and to serve as abutments for limiting axial movement of the cover, and the other row of fingers being disposed for detachable retaining engagement with the surface of a flange of the rim part, said fingers of said two rows being formed from a common inner margin of said portion.

12. In a vehicle wheel cover, a cover member having a part concealed behind a margin thereof, a plurality of rearwardly extending attachment fingers on said part including terminal engagement portions adapted for retaining engagement with a wheel, and a plurality of limit fingers on said part at locations spaced axially outwardly relative to said terminal portions, said limit fingers having distal end portions spaced from said margin and said part and flexibly movable relative thereto and adapted to engage a generally axially facing portion of the wheel to effect a spaced relation of the cover relative to the wheel.

GEORGE ALBERT LYON.

REFERENCES CITED

The following references are of record in the file of this patent:

UNITED STATES PATENTS

| Number | Name | Date |
| --- | --- | --- |
| Re. 19,467 | Lyon | Sept. 26, 1939 |
| 1,540,508 | White | June 2, 1925 |
| 2,102,471 | Lyon | Dec. 14, 1937 |
| 2,174,087 | Horn | Sept. 26, 1939 |